US008512837B2

(12) United States Patent
Barreneche

(10) Patent No.: US 8,512,837 B2
(45) Date of Patent: Aug. 20, 2013

(54) THIN FOAMED POLYETHYLENE SHEETS

(75) Inventor: Felipe Martinez Barreneche, Houston, TX (US)

(73) Assignee: Dow Global Technologies LLC, Midland, MI (US)

( * ) Notice: Subject to any disclaimer, the term of this patent is extended or adjusted under 35 U.S.C. 154(b) by 1111 days.

(21) Appl. No.: 10/560,732

(22) PCT Filed: Jun. 30, 2004

(86) PCT No.: PCT/US2004/021173
§ 371 (c)(1), (2), (4) Date: Dec. 15, 2005

(87) PCT Pub. No.: WO2005/007729
PCT Pub. Date: Jan. 27, 2005

(65) Prior Publication Data
US 2008/0138593 A1    Jun. 12, 2008

(51) Int. Cl.
*B29D 22/00* (2006.01)
(52) U.S. Cl.
USPC .......................................................... 428/36.5
(58) Field of Classification Search
USPC .......................................................... 428/36.5
See application file for complete search history.

(56) References Cited

U.S. PATENT DOCUMENTS

| | | | | |
|---|---|---|---|---|
| 3,963,403 A | * | 6/1976 | Hughes et al. | 425/325 |
| 4,360,556 A | * | 11/1982 | Heider | 428/131 |
| 4,533,578 A | | 8/1985 | Boyd et al. | |
| 4,649,001 A | * | 3/1987 | Nakamura et al. | 264/50 |
| 4,657,811 A | | 4/1987 | Boyd | |
| 5,000,992 A | * | 3/1991 | Kelch | 428/36.5 |
| 5,286,525 A | * | 2/1994 | Chen et al. | 427/256 |
| 6,096,793 A | | 8/2000 | Lee et al. | |
| 6,114,025 A | * | 9/2000 | DeVaudreuil et al. | 428/319.9 |
| 2003/0032731 A1 | | 2/2003 | Oswald | |

FOREIGN PATENT DOCUMENTS

| | | |
|---|---|---|
| DE | 202005002615 U1 | 6/2005 |
| GB | 2395948 A | 6/2004 |
| JP | 08-113660 | 5/1996 |
| WO | WO 9616122 A1 * | 5/1996 |
| WO | WO-01/92403 | 12/2001 |

OTHER PUBLICATIONS

Anonymous, "High melt strength foamed polyethylene using m-LLDPE or zigler-natta LLDPE resins," Research Disclosure Journal, Aug. 2000, RD436007, Kenneth Mason Publications Ltd: United Kingdom.

* cited by examiner

Primary Examiner — James Yager

(57) ABSTRACT

The present invention relates to the use of particular blends of LLDPE and LDPE together with specific fabrication conditions to make foamed sheets of thin gauge with MD tear properties similar to an equivalent gauge non-foamed sheet of the same composition. In particular, blends which combine a high MI LLDPE rich fraction with a low MI branched LDPE minor fraction provide the adequate balance of mechanical strength of the polymer base with its melt strength, extensibility and stress relaxation, allowing a thin foam film with MD tear strength which is comparable to non foamed counterparts of similar gauge and composition. The foamed films of the present invention are thin (generally from about 1 to 10 mils thick), and have an MD tear strength of at least about 160 grams for a 3 mil film as measured by ASTM D 1922. The foamed films of the present invention are preferably made at least in part from blends which comprise from 10 to 95 percent by weight of LLDPE having a relatively high (1.5 to 6) MI and from 5 to 90 percent of an LDPE resin having a relatively low MI (0.5 to 2.0).

18 Claims, 2 Drawing Sheets

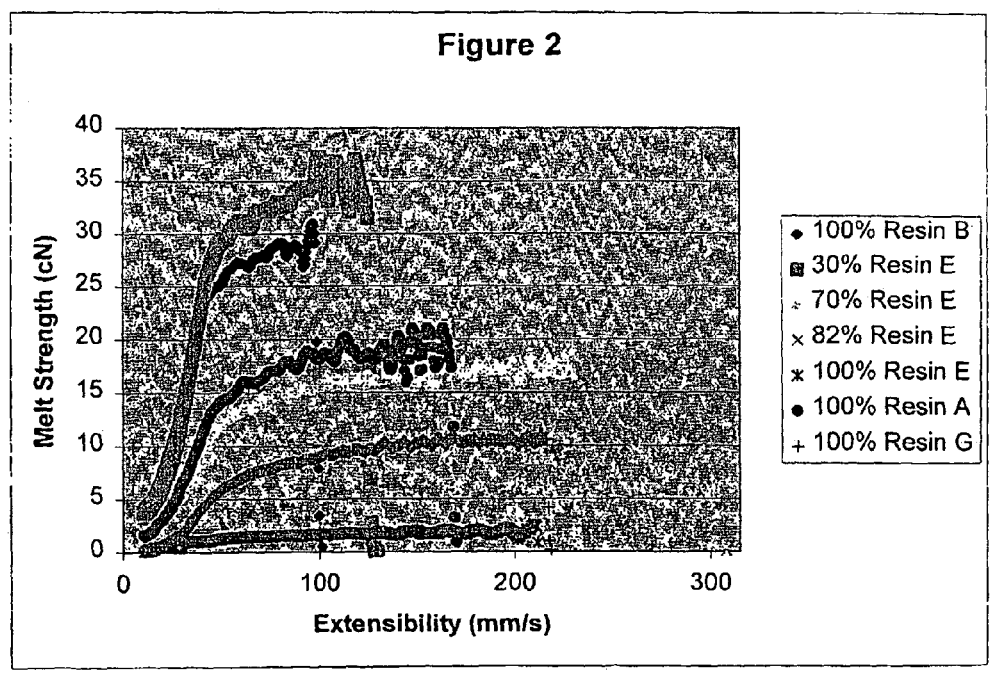

THIN FOAMED POLYETHYLENE SHEETS

The present invention relates to thin foamed polyethylene sheets, particularly those at gauges between 1 and 10 mils. These sheets have comparable MD tear strength as non-foamed sheets of the same gauge and composition. The invention also relates to the process of making such foamed sheets.

The thin sheets or films of the present invention are used in many applications, particularly in blown-film applications including consumer trash bags, grocery bags, produce bags, pallet wrap, food wrap, liners, heavy duty bags, industrial bags, consumer bags, shrink films, labels, pouches for FFS packaging, tapes, stand-up pouches, lamination films, protective films, health and hygiene film applications. Similar thin foamed films can be made using cast film and sheet extrusion lines, but these will exhibit preferential orientation in the MD direction and hence weaker properties. Foamed films can be made in the form of monolayer or coextruded films with multiple layers, where one or more of the layers are foamed. These thin foamed films can be further laminated to other substrates including, foil, paper, other plastics, or they can be post stretched in one or two directions for obtaining wrinkled skin surface effects. In the polyolefin industry, there has been a general trend to produce new high strength polymer resins. These resins have allowed film producers to downguage their product without sacrificing film strength or toughness. These thinner products have not been universally accepted however, as the perception of films of having a limp or flimsy feel. Accordingly, it is desired to produce films of greater thickness. It is not cost effective to simply use more resin to make a thicker sheet however, because of the cost of additional raw material. It is generally known that polyolefin resins can be foamed in order to produce a thicker film with the same amount of resin. It is generally understood, however that properties such as tensile strength, impact strength and elongation are related to density, and that the foaming process results in a product having less density and potential for weak failure spots. Thus, prior films or thin sheets made from foamed polyolefin material lacked adequate strength.

High pressure LDPE resins have been used in foaming applications due to their relatively high melt strength, strain hardening behavior and easy processing. However, when making a foamed sheet at gauges between 1 and 8 mils using conventional blown film processes with these resins, excessive orientation results, which in turns leads to very poor results in MD (machine direction) tear strength. Accordingly there is a need for thin films of reduced density which still exhibit acceptable physical properties, particularly MD tear strength.

Some reported solutions to the problem of increasing physical properties in thin foamed sheets include U.S. Pat. No. 4,657,811 and U.S. Pat. No. 4,533,578 which provide for coextrusion of unfoamed skin layers around the foamed layer. This method achieves the increase in tear strength at the expense of complexity of the film structure and lower overall density.

It is also generally known from work with thicker foam sheets that crosslinking provides molecular ties and that these molecular ties enhance physical/mechanical properties such as tensile strength, tear strength, higher temperature resistance, etc. As discussed in "Foamed Films Find New Niches", Plastics Technology Online, Jan H. Schut, February 2002), crosslinking is also being investigated as a way to improve mechanical support of thin foamed films. Crosslinking adds cost and complexity to the process, and results in material which cannot be easily recycled, and is therefore is less than ideal solution.

Yet another approach to improve physical properties is bi-orientation. As discussed in the Schut article mentioned above, traditional tenter frame bi-axial orientation for cast films are typically done in the semi-solid phase using a two step process (machine and transverse-direction orientation), usually ending in collapsing of the foam cells. Traditional Blown film process can achieve simultaneous orientation both in the machine direction and in the transverse direction, being able to apply up to 3:1 MD and 4:1 TD orientation levels, while the polymer is in the semi-molten state. Some new orientation methods reported in the Schut article claim to be able to have apply a bi-axial orientation of 3.5:1 in MD and 4.5:1 TD while the polymer is in the solid state, which gives even higher strength. In conventional (non-foamed) film extrusion it is known that the use of Linear Low Density Polyethylene (LLDPE) resins, especially those having fractional Melt Index (MI) and lower density, helps to improve MD tear properties. It is generally believed that resins with lower density and lower MI (higher molecular weight) produce better physical toughness. It is also known that for conventional films the use of high blow-up ratio (BUR) in processing the resin provides balanced machine direction/cross (or "transverse") direction orientation which improves overall film toughness.

For foamed applications, a blowing agent is added, which can be either a physical blowing agent such as dissolved isobutane, $CO_2$, or a chemical blowing agent (CBA), or both, as is generally known in the art. CBA is generally used when density reduction below 50 percent are desired. When more that 50 percent density reduction is desired, physical Blowing agents are preferably injected into the extruder, while CBA are still used in smaller amounts as bubble nucleators. CBAs require higher temperatures in order to activate the CBA and ensure adequate mixing. As the CBA is activated, small gaseous bubbles are formed and mixed throughout the matrix of the polymer, but the gas produced around these bubbles remains in solution in the polymer melt as long as the polymer melt pressure remains high. As the melt exits the die its pressure drops rapidly allowing the dissolved gas to come out of solution and causing the small bubbles to grow. The bubble growth will gradually stop as the polymer crystallizes as the film cools down. If the polymer has a viscosity which is too low, due to high melt temperatures or due to high melt flow index of the polymer, or if it does not have enough melt strength, the formed cells have a tendency to coalesce and eventually burst so the polymer melt will not retain all the bubbles, resulting in poor foaming Thus, viscosity levels and melt strength are important considerations for foamed applications. While it would appear that using low melt index (high molecular weight) resins would also be helpful in making the melt more viscous, it was observed that such resins generated unwanted shear heating, causing the melt temperature to rise too much making foaming difficult. In general, these higher temperatures act to decrease the viscosity, and this effect counters the benefit obtained from starting with the more viscous resin.

LLDPE resins are known to have poor melt strength and this property is further reduced as the Melt index of the polymer is increased (that is, the molecular weight is reduced). For this reason the use of these resins in non cross linked foaming applications has been limited to blends in small amounts where the major component is a high melt strength polymer like Low Density Polyethylene, (LDPE).

Accordingly, the methods of increasing MD tear strength traditionally used for conventional films, (such as the use of low Melt index LLDPE resins or use of pure or rich blends of LLDPE resins in general) are not necessarily applicable for foamed films and thus no foamed sheets having a thickness of 1 to 10 mil are known to possess adequate tear strengths, particularly MD tear strengths.

Surprisingly, it has been found that by using particular blends of LLDPE and LDPE together with specific fabrication conditions, foamed sheets of thin gauge can be made with MD tear properties similar to an equivalent gauge non-foamed sheet of the same composition. In particular, blends which combine a high MI LLDPE rich fraction with a low MI branched LDPE minor fraction provide the adequate balance of mechanical strength of the polymer base with its melt strength, extensibility and stress relaxation, allowing a thin foam film with MD tear strength which is comparable to non foamed counterparts of similar gauge and composition. The lower the density of this high MI LLDPE resin the better the MD tear but at the expense of film modulus. Thus, the foamed films of the present invention are thin (generally from 1 to 10 mils thick), and have an MD tear strength of at least 160 grams for a 3 mil film as measured by ASTM D 1922. The foamed films of the present invention are preferably made at least in part from blends which comprise from 10 to 95 percent by weight of LLDPE having a relatively high (1.5 to 6) MI and from 5 to 90 percent of an LDPE resin having a relatively low MI (0.5 to 2.0).

The fabrication conditions should be chosen to minimize cell size and minimize areas of concentrated stress. Such conditions include things such as optimizing die type, land length, die gaps, BUR, pressure and temperature profiles, line speed and output.

BRIEF DESCRIPTION OF THE DRAWINGS

FIG. 2 is a graph of melt strength vs. extensibility for several materials used in the examples.

Figure 1:
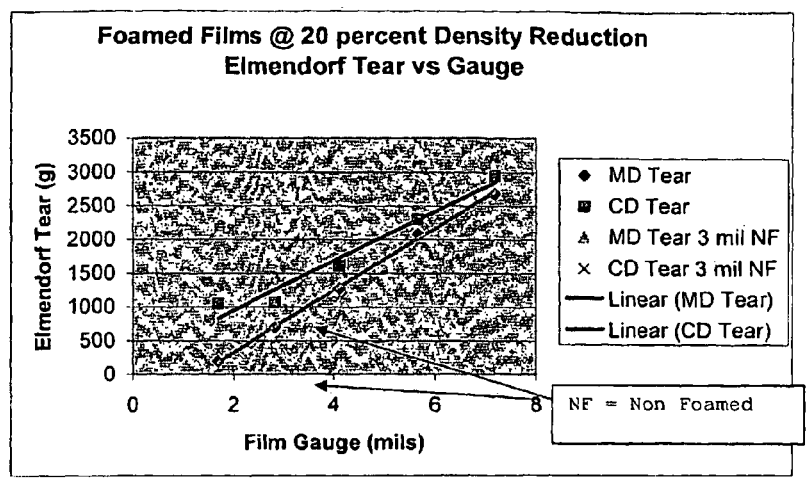
FIG. 1 is a graph of Elmendorf Tear vs. film gauge for the indicated materials

For purposes of the present invention "foamed sheets" or "foamed films" should be understood to include a single layer in a multilayer structure where the other layers may or may not be foamed sheets of the present invention, or a monolayer film, where the foamed sheet of the present invention is the only layer present.

The foamed sheet of the present invention is preferably at least 1 mils (25 microns) thick. While the foamed sheets can theoretically be made even thinner than this, tear strength rapidly decreases as the size of the bubbles which give the sheet its foamed characteristic, approach or exceed the size of the thickness of the sheet itself. The foamed sheets of the present invention are preferably no more than 10 mils (250 microns) thick, as thicker sheets typically do not need the added tear strength achieved by the present invention. If additional strength is needed for a particular application however, thicker sheets could be made according to the teaching of the present invention. More preferably, the foamed sheets are less than or equal to 8 mils (200 microns), still more preferably 5 mils (125 microns) or less, and most preferably are 2-3 mils (50 to 75 microns) thick.

For purposes of this invention the sheet shall be considered to be foamed if it exhibits a density reduction of at least 10 percent, as determined by an archimedes based method, or approximated by the equation density=film volume/film weight. It should readily be understood that greater reductions in density are possible, particularly in thicker films. It should be noted, however that tear strength generally drops with greater reductions in density, and so may be a limiting factor for a particular film. In general reductions in density of between 20 and 50 percent are most preferred for the thin films of the present invention. More preferably, the films exhibit a density reduction of at least 25 percent, and most preferably at least 30 percent, with a more preferable maximum of 40 percent, and a most preferred reduction of density of no more than 35 percent.

The foamed sheets of the present invention have increased physical properties compared to previous foamed sheets of similar thickness. For example the foamed sheets of the present invention have a tear strength in the machine direction of at least 160 grams for a sheet of 3 mil thickness, as measured by ASTM D 1922 Eilmendorf tear type B method. Preferably the MD tear strength of this 3 mil foamed film is at least 250 g, more preferably 360 g and most preferably above 525 gr, which is similar to the MD tear strength of non foamed films of the same composition. A foamed sheet of the present invention having a thickness of approximately 3 mil (75 micron) also preferably have a tear strength in the CD direction of at least 650 gr, more preferably 800 gr and most preferably above 1000 gr. At a thickness of 3 mil and above (75 micron), it was observed that the relationship between film thickness and tear strength was generally linear. Thus, it is preferred that the MD tear strength of the foamed film be greater than 50 grams/mil, more preferably greater than 100 grams/mil, even more preferably greater than 200 grams/mil and most preferably greater than 350 grams/mil. Films with a thickness less than approximately 3 mils show slightly reduced MD tear strength, however a film with a thickness of less than 3 mil should exhibit an MD tear strength of at least 25 grams/mil, more preferably greater than 50 grams/mil, even more preferably greater than 75 grams/mil and most preferably greater than 100 grams/mil.

The foamed sheets of the present invention also preferably exhibit increased gas transmission properties. Surprisingly, it has been observed that the gas transmission properties of these films typically increases more than would be expected when considering only the reduction in density. Preferably the films of the present invention exhibit a water vapor transmission rate of at least 0.5 g/100 sq·in*day at 3 mils gauge (normalized 1.5 g*mil/100 sq·in*day as measured according to ASTM F1249-90, more preferably greater than 0.65 g/100 sq·in*day (normalized 1.95 g*mil/100 sq·in*day). Similarly, the foamed sheets of the present invention preferably exhibit an oxygen vapor transmission of at least 200 cc/100 sq·in*day (normalized 600 cc*mil/100 in·sq*day as measured by ASTM method D3985-81, more preferably greater than 270 cc/100 sq·in*day (normalized 877.5 cc*mil/100 in·sq*day).

The films of the present invention exhibit equivalent to lower blocking when processed in blown film equipment, as compared with nonfoamed sheets of the same composition and gauge. They have a pearlescent appearance and a soft and silky textile touch with appeal to various consumer, hygiene and packaging markets. Due to its foamed nature, less amount of resin is required to provide an equivalent perceived thickness. Or, the same amount of material gives a higher perceived thickness, proportional to its density reduction. Also its foamed nature provides perceived sound and temperature insulation properties as well as added cushioning properties when compared to non foamed films of the same composition. The films of the present invention also exhibit static cling reduction and reduced blocking, so could be used in protective film applications without the need for antislip or anitblock additives.

Films of the present invention can be easily printed with reduced levels or even elimination of corona treatment due to its natural surface roughness which provides and enhances mechanical binding to the ink.

While not intending to be bound by theory, it is hypothesized that the increased tear properties and overall toughness may be related to the foamed sheets of the present invention having a very fine cell structure with homogeneously dispersed bubbles. The preferably rich LLDPE blends of the present invention can produce a very small and homogeneous cell structure showing between 60 to 100 cells per inch in the machine direction, and 90 to 120 cells per inch in the transverse direction. The thicker films (8 mils) will give the smaller cells when viewed in the MD direction (100 cells/inch), while the thin films (2 mils) give larger cells (60 cells/inch) as the cells are gradually elongated in the machine direction and narrowed in the transverse direction as the film is thinned down. Accordingly, when viewed in the transverse direction it will have thinner elongated bubbles which will show a higher cell count (90 cells/inch in a 2 mil film and 120 cells/inch in an 8 mil film). It is also theorized that the foamed sheets of the present invention exhibit lower crystalline orientation when compared to both LDPE rich blend counterparts, and even to some very rich LLDPE blends (>80 percent). The lower crystalline orientation would then contribute to explain the improved MD tear and toughness seen in the unique blends used in the foamed films of the present invention Another variable in the foamed sheets of the present invention is the amount of collapsed cells and/or bubble coalescence observed in the foamed sheets. Larger cells resulting from coalescence can cause a weak spot in the sheet, and thus should be avoided. Similarly, collapsed cells may weaken the overall properties of the sheets without providing any density reduction benefit.

The foamed sheets of the present invention can advantageously be made from polyolefin blends of LLDPE having a relatively high melt index (as compared with LLDPE resins normally used in blown film applications) and LDPE with a fractional MI, The preferred blends of the present invention have an LLDPE component with a density range of from 0.912 to 0.925 g/cc (as measured by ASTM D-792), and a melt index ($I_2$) of 1.5 to 6 (as measured by ASTM D-1238 (190° C./2.16 kg). More preferably the LLDPE has an MI in the range of 2.0 to 4.5. The LLDPE suitable for use in the present invention are generally as described for component A in U.S. patent application 2003/0032731, herein incorporated by reference in its entirety. Accordingly they may be homogeneous or heterogeneous polymers and can be made according to any means known in the art.

The LLDPE suitable for use in the present invention can be an interpolymer of ethylene with at least one $C_3$-$C_{20}$ alpha-olefin, as stated in U.S. 2003/0032731. Preferably the LLDPE is a copolymer of ethylene with butene, hexene, or octene, with octene being the most preferred. The LLDPE may be linear (that is, with no long chain branching) or substantially linear. The LLDPE may advantageously be made using a gas phase process or a solution process as is known in the art. Similarly, the catalyst used to make the LLDPE is not limited and includes ziegler-natta type catalysts as well as metalocenes.

In general, it has been observed that using LLDPE resins with lower MI was observed to cause more shear heating making difficult to keep melt temperature low enough for good foamability. Additionally low MI resins cause excessive orientation in the final foamed film, causing a low MD tear properties. On the other hand, it was also observed that using LLDPE with higher MI led to difficulties in foaming due to loss in melt strength. The use of lower density LLDPE resins contribute to better MD tear properties, but, it reduces the film Secant modulus which can be undesirable in some packaging applications. Accordingly, the polymer selection can be manipulated to optimize the required processability, melt strength, melt extensibility and stress relaxation to make a microcellular foamed film structure with relaxed and balanced MD/TD tear properties for a particular manufacturing system.

The LDPE component of the preferred blends for use in the present invention have a density range of from 0.917 to 0.925 g/cc (as measured by ASTM D-792), and a melt index ($I_2$) of 0.2 to 7.0, more preferably less than 2, and most preferably less than 1.0 (as measured by ASTM D-1238 (190° C./2.16 kg)). Preferably, the MI is less than 3, more preferably less than 2, and is greater than 0.5.

The LDPE resin used is a branched homopolymer or interpolymer made in tubular or autoclave reactors at pressures above 14,500 PSI (100 Mpa) with the use of free radical initiators. The LDPE suitable for use in the present invention can be selected from the broad class of compounds described as component B in US 2003/0032731. Accordingly, the LDPE is preferably an ethylene homopolymer but can be an interpolymer with one or more alpha or beta ethylenically unsaturated comonomers such as acrylic acid, methacrylic acid and vinyl acetate. Similarly, the catalyst used to make the LDPE is not limited and includes ziegler-natta type catalysts as well as metalocenes.

The LDPE component can also be optimized for a particular system, following the same general trends as for the LLDPE component. Thus, an LDPE with a lower MI is associated with increased melt strength but also causes shear heating making difficult to keep melt temperature low enough for good foamability. Additionally low MI resins have been associated with excessive orientation in the final foamed film, causing a low MD tear properties. On the other hand, it was also observed that using higher MI resins led to difficulties in foaming due to loss in melt strength. The use of lower density LDPE resins contribute to better MD tear properties, but, it reduces the film Secant modulus which can be undesirable in some packaging applications.

Preferably the blend comprises at least 10 percent by weight of the LLDPE more preferably at least 30 percent and most preferably 70 percent. The blend ideally comprises 90 percent or less by weight of the LLDPE and more preferably less than 80 percent, although higher amounts may be possible. The blend preferably comprises at least 10 percent by weight of the LDPE more preferably at least 18 percent and most preferably 30 percent. The blend ideally comprises less than 70 percent by weight of the LDPE and more preferably less than 30 percent. It should be readily understood that the blend can be optimized, depending upon the particular system. In general the LLDPE portion contributes more to the tear strength properties, whereas the LDPE portion aids in processability and foamability. Thus, for example, if a relatively high MI LLDPE is used, then processability may not be as big of an issue and therefore the LLDPE portion may comprise a larger proportion of the blend. Similarly, a high MI LDPE (for example, up to 6 MI) can be used but may require higher loading of it (for example 30 to 70 percent by weight LDPE) in order to achieve a blend with higher melt strength properties. The blend also contains a chemical blowing agent (CBA), which can be added by any means known in the art. The use of CBA and other foaming agents is exemplified by the teachings to processes of making ethylenic polymer foam structures and processing them in Chapter 9 of the "Handbook of polymeric Foams and Technology" entitled "Polyolefin Foam", written by C. P. Park, edited by D. Klempner and K. C. Frisch, Hanser Publishers, Munich, Vienna, New York Barcelona (1991), which is herein incorporated in reference. One preferred method is to add an endothermic CBA based on sodium bicarbonate and citric acid in a 20 percent to 50 percent LDPE masterbatch. The CBA should be added such that the amount of active CBA in the blend is at least 0.25 percent by weight, more preferably 0.4 percent and most preferably 0.6 percent. The CBA is preferably not added in amount such that it exceeds 1.0 percent more preferably 0.6 percent.

Minor amounts of other materials may also advantageously be used in the blend used to make the foamed sheets of the present invention. These include other polymer to provide added melt strength, foamability, stiffness like PS, SBR, PP, SBS slip additives to provide necessary coefficient of friction (COF) and pigments to provide coloring. PIB type additives may be added to provide enhanced cling features to the films. Process aids could also be added to help reduce shear heating, particularly when using lower MI blends. Other additives such as UV stabilizers, anti-static or fire retardants may be necessary to provide required functionality for specific applications, as is generally known in the art. These other materials should not be added in an amount greater than 2 percent, more preferably 0.5 percent and most preferably 0.1 percent depending on the additive.

The fabrication conditions for making the foamed sheets of the present invention also play a role in obtaining thin sheets with high tear strength. Typically, a medium shear barrier screw is used but it is also possible to use other screw designs including twin screws, and general purpose polyethylene, PP and PS screws. The screw should be able to have good mixing capabilities to efficiently disperse the CBA and homogenize the blend, be capable of processing LLDPE rich bends without generating excessive shear. It should be capable of building and maintaining pressure through the extruder to deliver a homogenous melt at high pressures (3000 to 6000) PSI to the adapter and die. Pressure through out the die should be maintained high up to the die lips where a sudden pressure drop occurs in order to minimize prefoaming prior to the die exit. The type of extrusion die used can be a common monolayer spider type die designed for high or low pressure operation. Low pressure dies, typically used for LLDPE film extrusion have demonstrated to provide less potential pressure variations, that can lead to premature foaming (prefoaming inside the die). The die gap should be no larger than 80 mils (thousands of an inch) (2.0 mm), preferably no larger than 50 mils (1.3 mm) and most preferably no larger than 20 mils (0.5 mm). In general larger die gaps were observed to be related to larger foam bubble structure in the foaming process, which is believed to be caused by prefoaming and bubble coalescense inside the die. Larger die gaps are known to cause more unwanted MD orientation. When larger foam bubbles are obtained the film does not have the pearlescent effect and soft touch seen in smaller microcellular cell type foamed films which were obtained with narrower gaps.

The Land Length of the die (the length of the parallel section of the die lips) has an important effect in assuring a fast pressure drop at the die lips, with minimum orientation of the molecules and low shear heating minimizing unwanted prefoaming inside the die. Ratios of the land length/die gap should be below 25, more preferably below 15 and most preferably below 12. These smaller ratios are preferred in order to obtain small microcellular foam responsible for the pearlescent aesthetics.

The extruder should use a reverse temperature profile with a peak temperature of 450° F., in order to fully activate the CBA. There is also ideally a gradual decent to a die lip temperature of 340° F. The process should have a high RPM (60 to 80 percent of the maximum RPM), for example 90 to 110 RPM for a 2½ in extruder, with high throughput (low residence times), for example 6-10 lbs/hr/rpm. High throughput is equivalent to low residence time) and a fast pressure drop (5000+PSI at the screen pack down to 1200 psi (or higher) at the die for as few seconds before the die gap and down to atmospheric pressure at the die exit when foam growth takes place. Ideal pressures in the extruder can vary from 3000 to 6500 psi, while pressures at the die are ideally at or above 800 psi. If the pressure at the die drops below 600 to 700 PSI, prefoaming inside the die is likely to result, leading to bigger and fewer bubbles and poor aesthetics. Having pressure above 5000 psi at the screen pack helps to maintain a resultant pressure at the die above 1200 psi after the initial pressure drop, which helps ensure that the polymer reaches the die lips with minimal amounts of foaming occurring until the die exit.

A high BUR was also seen to be beneficial for forming the thin foamed sheets of the present invention. It is preferred that the ratio be from 2.2 to 4.0 BUR, more preferably from 2:5 to 3.5:1. BURs above this range tended to cause problems in forming a stable bubble whereas BURs below this range tended to be associated with a film having very unbalanced properties, particularly very low MD tear values. The use of internal bubble cooling (IBC) can provide additional cooling and help stability of foaming process.

It should be readily appreciated by one skilled in the art, that the blend components and fabrication conditions can be chosen to optimize the chance of successfully making a thin foamed sheet of the present invention.

The following examples are illustrative of the invention, but are not intended to limit the scope of the invention in any way.

EXAMPLES

Thin sheets were formed from the LDPE and LLDPE resins indicated in Table 1. Resin A was LDPE with a Melt Index (MI) (at 190° C./2.16 kg) of 2.3 and a density of 0.920. Resin B was LDPE with an MI of 0.47 gr/10 min and a density of 0.920. Resin C was LLDPE with an MI of 0.5 and a density if 0.920. Resin D was LLDPE with an MI of 1.0 and a density of 0.920. Resin E was LLDPE with an MI of 2.3 and a density of 0.917. Resin F was an ULDPE with MI of 4 and density of 0.904 gr/cc. The Chemical Blowing Agent or CBA used was SAFOAM FPE-50 which contains 50 percent of active ingredient of encapsulated sodium salts of carbonic and polycarboxylic acids, in a polyethylene carrier. 3 mil gauge films were produced using a 2.5 inch extruder equipped with an 8 inch low pressure die and medium shear barrier screw. A 40 mil die lip with ½ inch land length was used. The line was run at 220 lbs·hr rate. MD tear strength was then measured according to ASTM D 1922 Elmendorf type B method. Puncture Propogation Tear (PPT) was determined according to ASTM D-2582-93.

TABLE 1

| | Sample # | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Resin formulation | | | | | | | | | | | | |
| Resin A | 68 | 69 | 68.5 | 68.5 | 68.5 | 30 | 30 | | | | | |
| Resin B | | | | | | | | 30 | 68.5 | 68.5 | 30 | 30 |
| Resin C | 30 | 30 | 30 | 30 | | | | | | | | |
| Resin D | | | | | 30 | 68.5 | | | | | | |
| Resin E | | | | | | | 68.5 | 68.5 | 30 | | | 68.5 |
| Resin F | | | | | | | | | | 30 | 68.5 | |
| Safoam FPE-50 (%) | 2 | 0.5 | 1 | 1 | 1 | 1 | 1 | 1 | 1 | 1 | 1 | 1 |
| Blow Up Ratio | 2.5 | 2.5 | 2.5 | 3.2 | 3.2 | 3.2 | 3.2 | 3.2 | 3.2 | 3.2 | 3.2 | 3.2 |
| Film Properties | | | | | | | | | | | | |
| Gauge (mils) | 3.1 | 2.9 | 3.09 | 2.94 | 3 | 2.87 | 2.87 | 3.03 | 3.09 | 2.42 | 2.83 | 3 |
| Density reduction (%) | 31.6 | 4.5 | 30.1 | 21.1 | 18.3 | 18.5 | 23 | 26.4 | 21.7 | 6.2 | 14.1 | 22.7 |
| MD Elmendorf Tear (g) | 41 | 234 | 99.6 | 200 | 144 | 212 | 381 | 520 | 216 | 198 | 578 | 406 |
| PPT Tear (cm) | 12.4 | 4.78 | 0 | 6.48 | 7.24 | 8.74 | 8.14 | 6.86 | 4.94 | 5.16 | 6.1 | 8.4 |
| Processing conditions | | | | | | | | | | | | |
| RPM | | 73.1 | 73.1 | 73.1 | 73.1 | 71.3 | 73.1 | 73.1 | 73.1 | 73.1 | 73.1 | 104.1 |
| Output Lbs/hr | | 151 | 147 | 144 | 145 | 155 | 158 | 159 | 150 | 168 | 154 | 224.4 |
| Melt Temperature F. | | 365 | 366 | 368 | 366 | 383 | 375 | 381 | 376 | 374 | 372 | 396 |
| Barrel P1 (PSI) | | 2820 | 2930 | 3110 | 3060 | 3430 | 3630 | 3980 | 4020 | 3980 | 3700 | 4440 |

Foamed films with gauges ranging from 2 to 8 mils were produced using Sample #8 (see table above) with 2.5 percent by weight of a masterbatch containing eurucamide as a slip (total active ingredient was only 1.25 percent eurucamide). Sample 13 was not foamed and serves as a comparison. These films were analyzed to determine MD and CD tear, elongation, yield and peak load, and the values were reported in Table 2, and a graph of tear strength vs. gauge of film was presented in FIG. 1. MD Tear was done using ASTM D1922, and Tensile properties (Elongation, Yield and load at 2 percent (Lb). were done using ASTM D882.

TABLE II

| | 13 | 14 | 15 | 16 | 17 | 18 |
|---|---|---|---|---|---|---|
| MD Tear | 778.3 | 192.6 | 699.6 | 1272 | 2086.6 | 2684 |
| CD Tear | 1323 | 1054 | 1069 | 1612 | 2307 | 2944 |
| Av Gauge | 3.32 | 1.68 | 2.85 | 4.12 | 5.66 | 7.17 |
| Avg MD Load @ 2 percent (Lb) | 1.47 | 0.634 | 1.068 | 1.668 | 2.464 | 3.192 |
| Avg CD Load @ 2 percent (Lb) | 1.636 | 0.704 | 1.204 | 1.594 | 2.454 | 3.098 |
| AV Md Elongation | 435.27 | 425.042 | 589.037 | 584.623 | 648.101 | 513.239 |
| Av CD ELongation | 810.308 | 268.076 | 388.962 | 512.047 | 616.32 | 587.657 |
| MD Yield lbs | 4.917 | 1.922 | 3.92 | 5.12 | 7.78 | 9.289 |
| CD Yield Lb | 4.556 | 1.46 | 2.778 | 4. 389 | 6.76 | 9.07 |

A series of 3 mil gauge films were prepared in identical fashion, varying only the LDPE and LLDPE content (so that the total amount was 100 percent). The LDPE used was Resin B and the LLPDE used was resin Resin E. Resin G was a ULDPE with a MI of 5.5 and a density of 0.918. The melt strength and extensibility was measured and the resulting plots appear in FIG. 2, which clearly displays the synergism achieved by the blends of the present invention. For this figure, Melt strength was determined using a Gottfert Rheotens unit at 190° C. The measurements were conducted by pulling strands of molten polymers or blends at constant acceleration until breakage occurred. Experimental set consisted of a capillary rheometer and a Rheotens apparatus as take-up devise. The force required to axially extend the strands was recorded as a function of take up velocity. The maximum forced attained before draw resonance or breakage was recorded as the melt strength in cN. The velocity in mm/sec at which this maximum force was recorded was defined as melt extensibility. The tests were done under the following conditions: Temperature=190° C., Capillary length/diameter of 41.9 mm/2.1 mm, Piston diameter 9.54 mm, piston velocity 0.423 mm/sec, shear rate 33 s.sup.-1. Draw-down distance 100 mm (die exit to take-up wheels). Cooling conditions at ambient air, and acceleration 2.4 mm/s.sup.2

The invention claimed is:

1. A blown film consisting of one or more foamed polyolefin sheets wherein at least one foamed polyolefin sheet is 3 to 8 mils thick and has an MD tear strength of at least 150 g/mil wherein the sheet is made from a blend comprising 10-90 percent by weight LLDPE and 90-10 percent LDPE and wherein the LLDPE has a density in the range of 0.900 to 0.930 g/cc and an MI in the range of from 2 to 6 g/10min; wherein the at least one foamed polyolefin sheet has a density reduction of from 10 to 50 percent compared to a non foamed sheet of the same composition.

2. The film of claim 1 wherein the sheet is about 3 mils (75 microns) thick.

3. The film of claim 1 wherein the MD tear strength is greater than 350 gr/mil.

4. The film of claim 1 wherein the oxygen vapor transmission is 2.18 gr.mil/100 in.sq*24 hr.

5. The film of claim 1 wherein the water vapor transmission is 270 cc.mil/100 in.sq*24 hr.

6. The film of claim 1 wherein the sheet has a density reduction of at least 20 percent compared to a non foamed sheet of the same composition.

7. The film of claim 1 wherein the blend comprises from 50 percent to 90 percent by weight of LLDPE.

8. The film of claim 1 wherein the blend comprises about 70 percent by weight LLDPE.

9. The film of claim 1 wherein the LDPE has a density in the range of 0.917 g/cc to 0.923 g/cc and an MI in the range of 0.2 to 6 g/10 min.

10. The film of claim 1 wherein the sheet has been made using a land length to die gap ratio of less than 25.

11. The film of claim 1 wherein the sheet has been made using a blow up ratio of from about 2.2 to about 4.0.

12. The film of claim 1 wherein the polyolefin has no crosslinking.

13. A blown film consisting of one or more foamed polyolefin sheets wherein at least one foamed polyolefin sheet is less than 3 mils thick and has an MD tear strength of at least 50 g/mil, wherein the sheet is made from a blend comprising 10-90 percent by weight LLDPE and 90-10 percent LDPE and wherein the LLDPE has a density in the range of 0.900 to 0.930 g/cc and an MI in the range of from 2 to 6 g/10 min; wherein the at least one foamed polyolefin sheet has a density reduction of from 10 to 50 percent compared to a non foamed sheet of the same composition.

14. The film of claim 13 wherein the sheet has a density reduction of at least 20 percent compared to a non foamed sheet of the same composition.

15. The film of claim 13 wherein the blend contains about 70 percent LLDPE.

16. The film of claim 13 wherein the sheet has been made using a land length to die gap ratio of less than 25.

17. The film of claim 13 wherein the sheet has been made using a blow up ratio of from about 2.2 to about 4.0.

18. A consumer trash bag, grocery bag, produce bag, pallet wrap, food wrap, liner, heavy duty bag, industrial bag, consumer bag, shrink film, label, pouches for FFS packaging, tape, stand-up pouch, lamination film, or protective film comprising the foamed sheet of claim 13.

* * * * *